United States Patent [19]

Pan-Ratzlaff

[11] Patent Number: 5,768,541
[45] Date of Patent: Jun. 16, 1998

[54] SYSTEM FOR HOT-PLUGGING PERIPHERAL DEVICE TO COMPUTER BUS AND DISCONNECTING PERIPHERAL DEVICE UPON DETECTING PREDETERMINED SEQUENCE OF KEYSTROKES INPUTTED BY USER THROUGH KEYBOARD

[75] Inventor: Ruby Pan-Ratzlaff, Cedar Park, Tex.

[73] Assignee: Dell U.S.A., L.P., Austin, Tex.

[21] Appl. No.: 490,756

[22] Filed: Jun. 15, 1995

[51] Int. Cl.[6] .............................. G06F 13/00; G06F 13/38; G06F 13/40
[52] U.S. Cl. .................. 395/283; 395/284; 395/828; 395/830
[58] Field of Search ................................ 395/828, 830, 395/283, 284, 281

[56] References Cited

U.S. PATENT DOCUMENTS

| | | | |
|---|---|---|---|
| 4,835,737 | 5/1989 | Herrig et al. | 364/900 |
| 4,852,031 | 7/1989 | Brasington | 364/578 |
| 5,138,305 | 8/1992 | Tomiyasu | 340/717 |
| 5,317,697 | 5/1994 | Husak et al. | 395/325 |
| 5,375,210 | 12/1994 | Monnes et al. | 395/275 |
| 5,463,261 | 10/1995 | Skarda et al. | 307/131 |
| 5,515,515 | 5/1996 | Kennedy et al. | 395/283 |
| 5,526,493 | 6/1996 | Shu | 395/281 |
| 5,530,810 | 6/1996 | Bowman | 395/283 |
| 5,548,635 | 8/1996 | Bradley et al. | 379/102 |
| 5,564,024 | 10/1996 | Pemberton | 395/283 |
| 5,594,874 | 1/1997 | Narayanan et al. | 395/284 |

*Primary Examiner*—Thomas C. Lee
*Assistant Examiner*—Rehana Perveen
*Attorney, Agent, or Firm*—Haynes and Boone, L.L.P.

[57] ABSTRACT

A system and method is disclosed for hot-plugging a peripheral device via an array of interface switches to a computer bus having active signals thereon. The peripheral device is electrically connected to the interface switches via a device controller. The interface switches are disabled from passing electrical signals through the switches to the controller and the peripheral device, operating power is supplied to the controller, the disabled interface switches are electrically connected to the computer bus, and the interface switches are electrically enabled to pass signals from the computer bus through the interface switches and the controller to the peripheral device.

2 Claims, 4 Drawing Sheets

SYSTEM FOR HOT-PLUGGING PERIPHERAL DEVICE TO COMPUTER BUS AND DISCONNECTING PERIPHERAL DEVICE UPON DETECTING PREDETERMINED SEQUENCE OF KEYSTROKES INPUTTED BY USER THROUGH KEYBOARD

TECHNICAL FIELD

The invention relates generally to systems for connecting peripheral devices to personal computers and, more particularly, to a method and apparatus for hotplugging such devices into portable personal computers.

BACKGROUND OF THE INVENTION

Portable personal computers (PCs) were first introduced in the early 1980s and have, since then, enjoyed great commercial success and consumer acceptance. Due to their small size though, portable PCs have been limited in ways that larger desktop PCs have not been. For example, a portable PC cannot include a large monitor display and, for all practical purposes, still be portable. Furthermore, the keys on a portable PC can not be as spaciously or ergonomically arranged as the keys on a full size keyboard and, in particular, can rarely be arranged to include a dedicated numerical entry keypad as is commonly found with desktop PCs. The pointing device included with a portable PC is typically limited to a rolling ball mounted therein rather than an easier-to-use mouse typically utilized with desktop PCs. Additionally, portable PCs cannot accommodate advanced technology (AT) cards commonly used in desktop PCs, thereby significantly limiting the expendability and upgradability of a portable PC.

One solution to the limitations of portable PCs has been provided by docking interface devices such as "docking stations" or "port replicators" which are preconnected to peripheral devices such as a conventional desktop display monitor, keyboard, and mouse, and are then readily connected to a portable PC so that the peripheral devices are then electrically connected to the PC. Some interface devices include more advanced features such as network and SCSI connections. A docking device can thus provide a portable PC with features and functions normally found only with desktop PCs. A problem with docking interface devices is that a PC must be powered-down when the interface device is docked (connected) to or undocked (disconnected) from the PC. To then use the PC, the PC must be powered-up and re-booted, an inconvenient and timeconsuming task.

If a device, particularly a device such as a network or SCSI device, is docked to or undocked from a PC while the latter is powered-up (i.e., "hot"), that is, if such a device is "hot plugged" to a PC, then electrical and/or logical problems may result. With respect to electrical problems, the transmission of a powered-up signal to an unpowered semiconductor chip could destroy the chip. With respect to logical considerations, there is generally a significant amount of activity on the bus of a hot PC, to which bus PC system component devices are connected. If an unpowered ("cold") device is connected to an active ("hot") bus, then the entire bus will be brought down to a low logical level, the PC will become inoperable, and data may be lost.

One known method of ameliorating the problems of hot-plugging a docking interface device to a PC is to ensure that peripheral devices connected to the interface device are powered-up at all times. Such a method, however, would not utilize energy very efficiently. To more efficiently utilize energy, a mechanical block or switch may be installed so that a hot PC is unable to dock with an interface device until peripheral devices connected to the interface device are fully powered-up. A user would then be required to activate the switch prior to the docking activity to alert the docking device of the impending activity and to provide sufficient time for the dock to power up and for the PC bus to be isolated until all power connections are made. The problem with such a method is that special attention and involvement is required of the user and, furthermore, such a method is not much simpler or more convenient than just turning off the PC prior to docking and then re-booting the system.

Therefore, what is needed is a docking interface device which may be hot-plugged into a portable PC without adversely affecting the integrity of the PC or its bus and without wasting electrical energy or requiring special involvement from a user.

SUMMARY OF THE INVENTION

The foregoing problems are solved and a technical advance is achieved by a system and method for disabling a docking interface device until after the interface device is hot-plugged to a portable PC bus. In a departure from the art, the interface device is provided with switches which are disabled to prevent peripheral devices connected to the interface device from being electrically connected to the PC bus until after the interface device is fully connected thereto and the peripheral devices are powered-up.

In a preferred embodiment of the invention, a method is disclosed for hot-plugging a peripheral device via an array of interface switches to a computer bus having active signals thereon. The peripheral device is electrically connected to the interface switches via a device controller. The interface switches are disabled from passing electrical signals through the switches to the controller and the peripheral device, operating power is supplied to the controller, the disabled interface switches are electrically connected to the computer bus, and the interface switches are electrically enabled to pass signals from the computer bus through the interface switches and the controller to the peripheral device.

A technical advantage achieved with the present invention is that it permits a docking device to be readily, and safely, hot-plugged into a PC.

Another technical advantage achieved with the invention is conservation of electrical energy by eliminating the need for the docking device to be powered-up at all times.

Yet another technical advantage achieved with the invention is compatibility with "Plug and Play" hot card capabilities available with state of the art operating systems.

DETAILED DESCRIPTION OF THE PREFERRED EMBODIMENT

Figure 1:
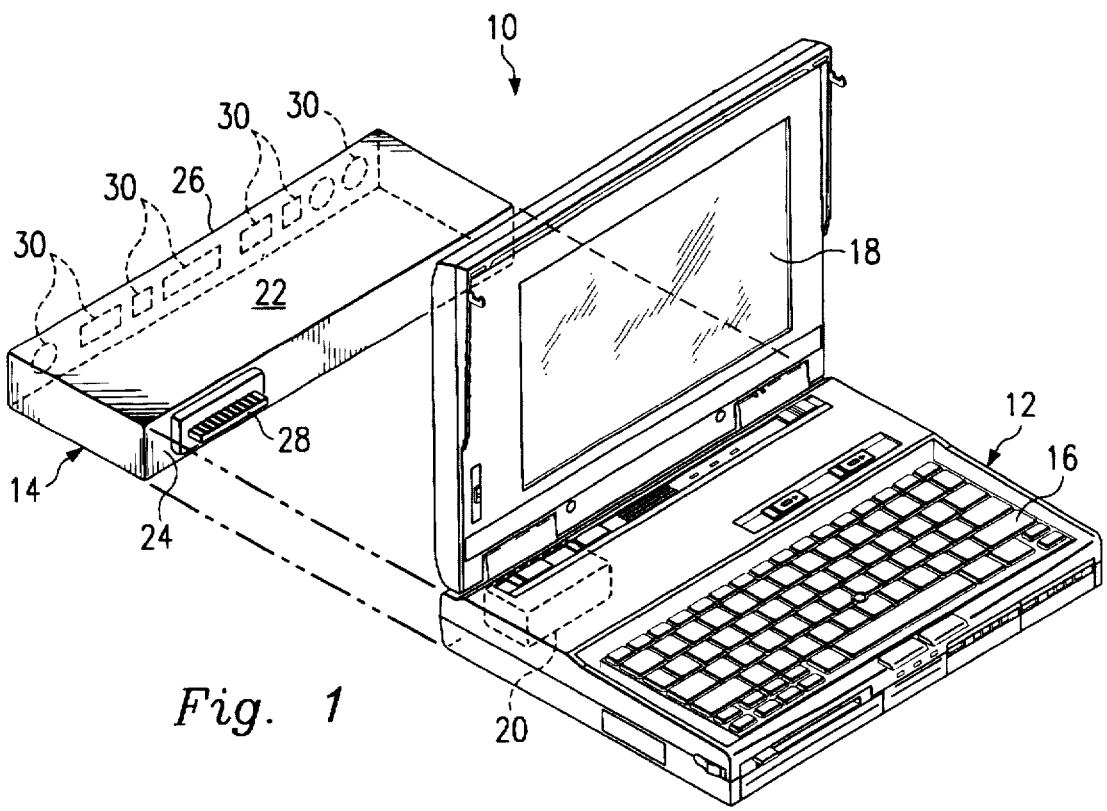
FIG. 1 is a perspective view of a portable personal computer system utilizing an interface device of the present invention.

FIG. 1 illustrates a perspective view of a computer system 10 having a portable PC 12 and a docking interface device 14 which embodies features of the present invention. The PC 12 includes a keyboard 16, a display 18, a PC connector 20 (shown in dashed outline), and a conventional industry standard architecture (ISA) bus to be described with reference to FIG. 5. The interface device 14 includes a housing 22 having a front side 24 and a rear side 26, a device connector 28 located on the front side, and a plurality of connector ports 30 located on the rear side.

Figure 2:
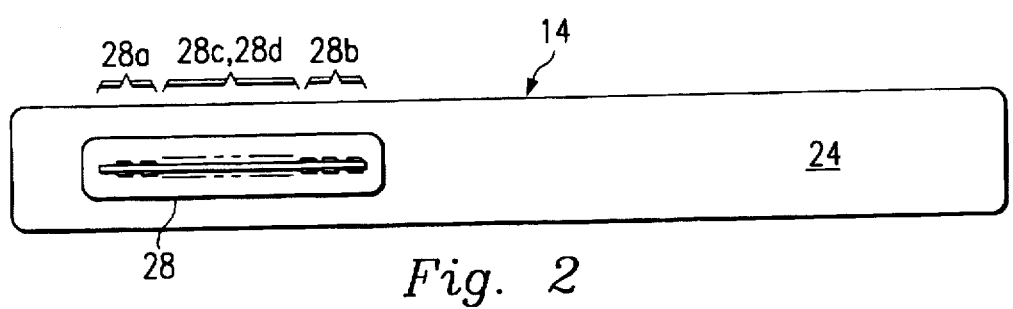
FIG. 2 is a front elevational view of the interface device of FIG. 1.

FIG. 2 shows a detailed elevational view of the front side 24 of the interface device 14. As partially shown therein, the device connector 28 includes two extended-length pins 28a and 28b, 64 bus pins 28c, and 134 pass-thru pins 28d configured to be received by receptacles (not shown) located in the PC connector 20, thereby enabling the device to be plugged into and electrically connected to the PC. The extended-length pins 28a, 28b extend approximately 3.5 millimeters (mm) outwardly from either end of the connector 28. The pins 28c, 28d are interspersed between the pins 28a, 28b and extend approximately 3.0 mm outwardly from the connector 28.

Figure 3:
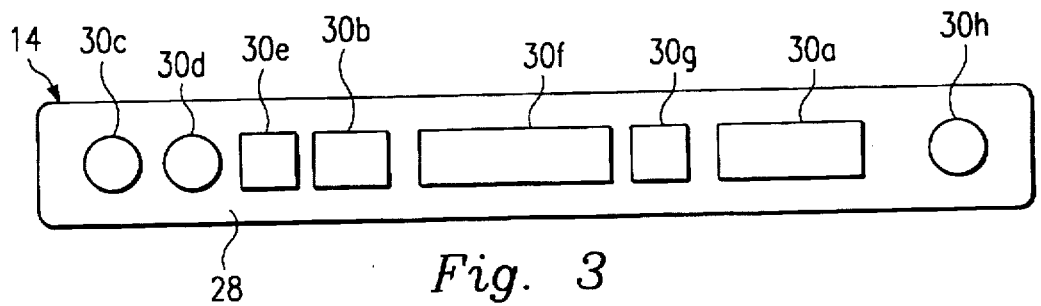
FIG. 3 is a rear elevational view of the interface device of FIG. 1.

FIG. 3 shows a detailed elevational view of the rear side 26 of the interface device 14 and the ports 30. Circuitry, to be described with reference to FIG. 4, located in the interface device 14 electrically connects the pins 28c, 28d to the ports 30. Specifically, the pins 28c are operative for connecting the ISA bus of the PC 12 to a SCSI controller and Ethernet controller, to be described with reference to FIG. 4, located in the interface device 14. The SCSI controller is connected to a SCSI-2 port 30a and the Ethernet controller is connected to a 10Base-T network connector 30b. The 134 pass-thru pins 28d are operative for receiving signals from the PC 12 and then passing them directly through the interface device 14 to a PS/2 mouse port 30c, a PS/2 keyboard port 30d, a serial port 30e, a parallel port 30f, and a video port 30g. It can be appreciated that the ports 30c, 30d, 30e, 30f, and 30g are not connected directly to the ISA bus and, furthermore, that peripherals connected to any of such ports receive signals from the PC 12 through the interface device 14 as though the peripherals were connected directly to the PC. An AC-adapter port 30h, to be discussed in greater detail with reference to FIG. 4, is also provided for supplying power to the PC 12 and/or device drivers located in the interface device 14.

Figures 4, 5:
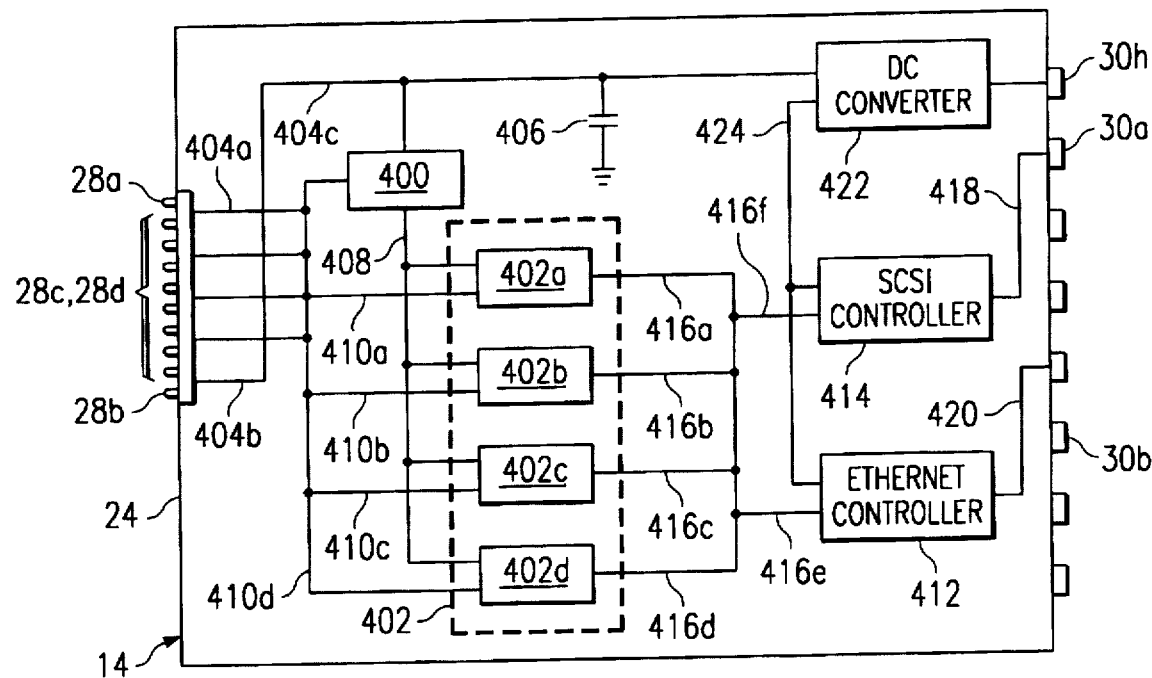
FIG. 4 is a schematic diagram of the interface device of FIG. 1.
FIG. 5 is a schematic diagram of a portable personal computer having a connection for receiving the interface device of FIG. 1.

FIG. 4 is a schematic diagram of the interface device 14 showing the connector 28, an interface controller 400, and an array 402 of interface switches 402a, 402b, 402c, 402d. The interface switches 402a, 402b, 402c, 402d are commercially available as "QuickSwitches™", part number QS32X245, from Quality Semiconductor, Inc. Each of the switches 402a, 402b, 402c, 402d includes a set of 16 high-speed switches. The extended-length pins 28a and 28b of the device connector 28 are connected to the input of the interface controller 400 via lines 404a and 404b, respectively, which connect to a line 404c connected to the controller. A 1 μF capacitor 406 is connected at one end to the line 404c and at the other end to ground. The output from the controller 400 is connected, via a line 408, to the four switches 402a, 402b, 402c, 402d for enabling (i.e., closing) or disabling (i.e., opening) the switches thereof. When initially powered-up, the switches 402a, 402b, 402c, 402d assume a default configuration in which they are disabled. The 64 pins 28c are connected to the input of the interface switches 402a, 402b, 402c, 402d via four arrays of trace etches 410a, 410b, 410c, 410d, respectively, arranged on a planar (logic) board (not shown), each of which arrays includes 16 trace etches for carrying signals from 16 of the pins 28c to corresponding interface switches. The pins 28c are also connected to the interface controller 400 via an array of trace etches 410e. The output of the interface switches 402a, 402b, 402c, 402d is connected to an Ethernet controller 412 and a SCSI controller 414, via six arrays of trace etches 416a, 416b, 416c, 416d, 416e, 416f. The Ethernet controller 412 is connected to the port 30b via an array of trace etches 418, and the SCSI controller 414 is connected to the port 30a via an array of trace etches 420.

As further shown in FIG. 4, a DC-to-DC voltage converter 422 is located in the interface device 14 for receiving power from an external AC adapter source, through the port 30h. The DC-to-DC converter 422 is electrically connected to the line 404c for receiving an enable signal thereon when the interface device 14 is docked to the PC 12. The DC-to-DC converter 422 is also enabled to supply 5 volt DC power to activate the Ethernet and SCSI controllers 412, 414, respectively, via a line 424 in response to a 5 volt signal on the line 404c. The DC-to-DC converter 422 is also connected for providing power to operate the PC 12 and/or to charge batteries used by the PC when the interface device 14 is plugged into the PC. It is understood, however, that the DC-to-DC converter 422 does not supply main power, such as 120 VAC power, to devices, such as a monitor, connected to the ports 30.

FIG. 5 is a schematic diagram of the PC 12 showing the PC connector 20 connected to a computer ISA bus 500. The bus 500 interconnects the connector 20 to a microprocessor 502, a conventional RAM memory chip 504, a display 506, and a keyboard 508. A basic input-output system (BIOS) chip 510 is also connected to the bus 500 for controlling devices connected to the bus 500 in a manner commonly known in the art. The RAM 504 may be used for storing device drivers. Software may also be stored in the RAM 504 to generate a user interface for a user to select where power from the power adaptor 418 should be directed and hence which devices are activated.

It can be appreciated that the PC 12 and the interface device 14 may be electrically connected together via the respective connectors 20 and 28. It can be further appreciated that when the PC 12 and the interface device 14 are so connected, the interface switches 402a, 402b, 402c, 402d of the array 402 are enabled by the interface controller 400, and the Ethernet and SCSI controllers 412, 414 are powered-up by the DC-to-DC converter 422, then signals generated by the PC 12 to the computer bus 500 are passed to a network or SCSI device connected to the interface device 14 via the connectors 20, 28, the trace etches 410a, 410b, 410c, 410d, the interface switch array 402, the trace etches 416a, 416b, 416c, 416d, 416e, 416f, the Ethernet and SCSI controllers 410 and 412 and respective trace etches 418, 420, and respective ports 30b and 30a.

The interface switches 402a, 402b, 402c, 402d may be disabled to facilitate the process of connecting together and disconnecting the connectors 20 and 28. Specifically, when the connectors 20 and 28 are being connected, the bus interface 402 may be disabled until the Ethernet and SCSI controllers 412, 414 are powered-up by the DC-to-DC converter 422 and until all the pins 28c and 28d are fully seated in the PC connector 20. When the interface switches 402a, 402b, 402c, 402d are then enabled, the devices connected to the ports 30a, 30b will not disrupt the ISA bus 500. Conversely, when the connectors 20, 28 are to be disconnected, the interface switches 402a, 402b, 402c, 402d may be disabled to prevent the pins 28c, 28d from making intermittent contact with the connector 20 and bouncing between 5 volts DC and ground, thereby disrupting the ISA bus 500 during the disconnection process. The capacitor 406 ensures that there is power to maintain the switches in a disabled state during the disconnection process.

Figure 6A:
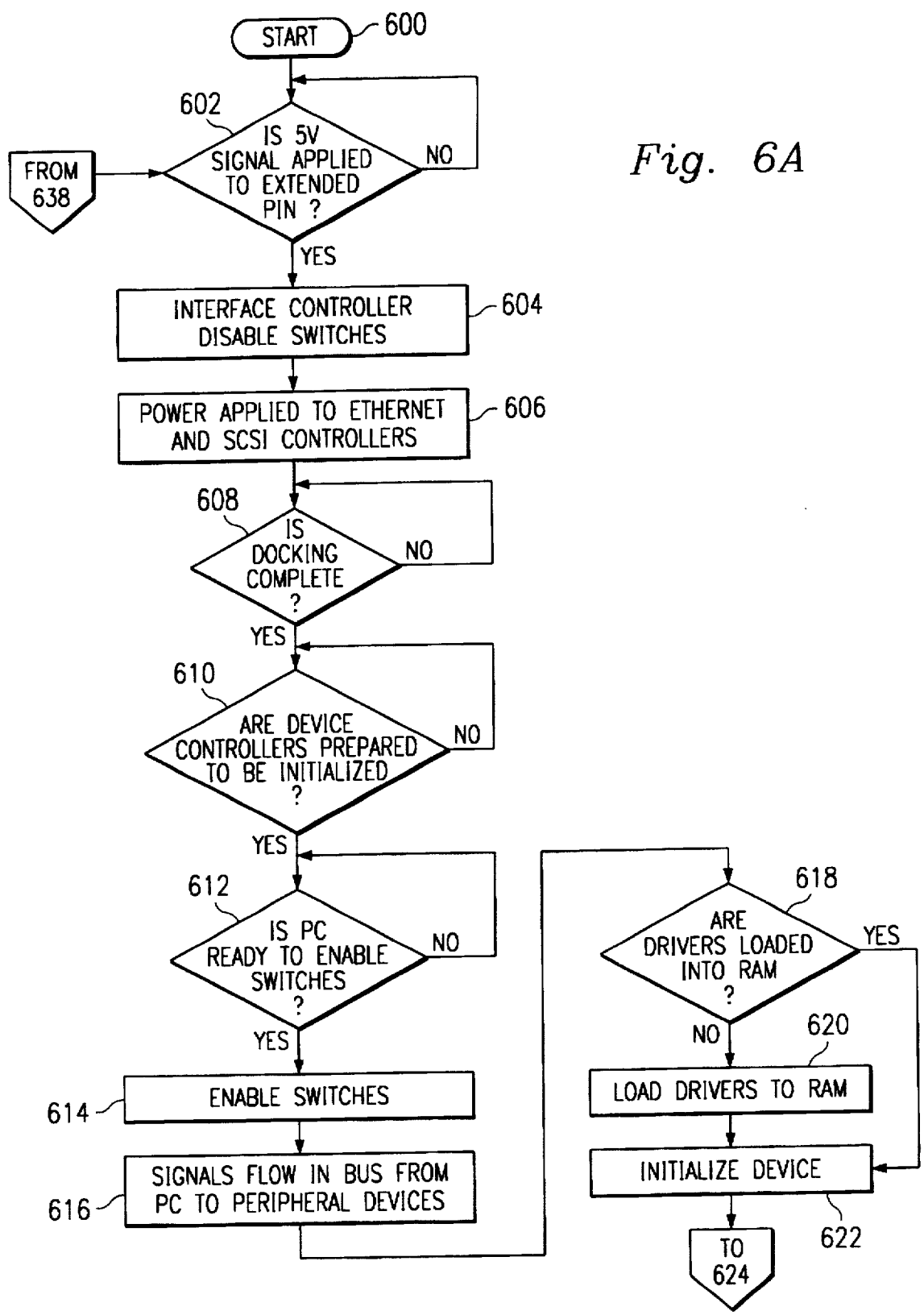
FIGS. 6A and 6B are flowcharts of logic implemented by the system of the present invention.
Figure 6B:
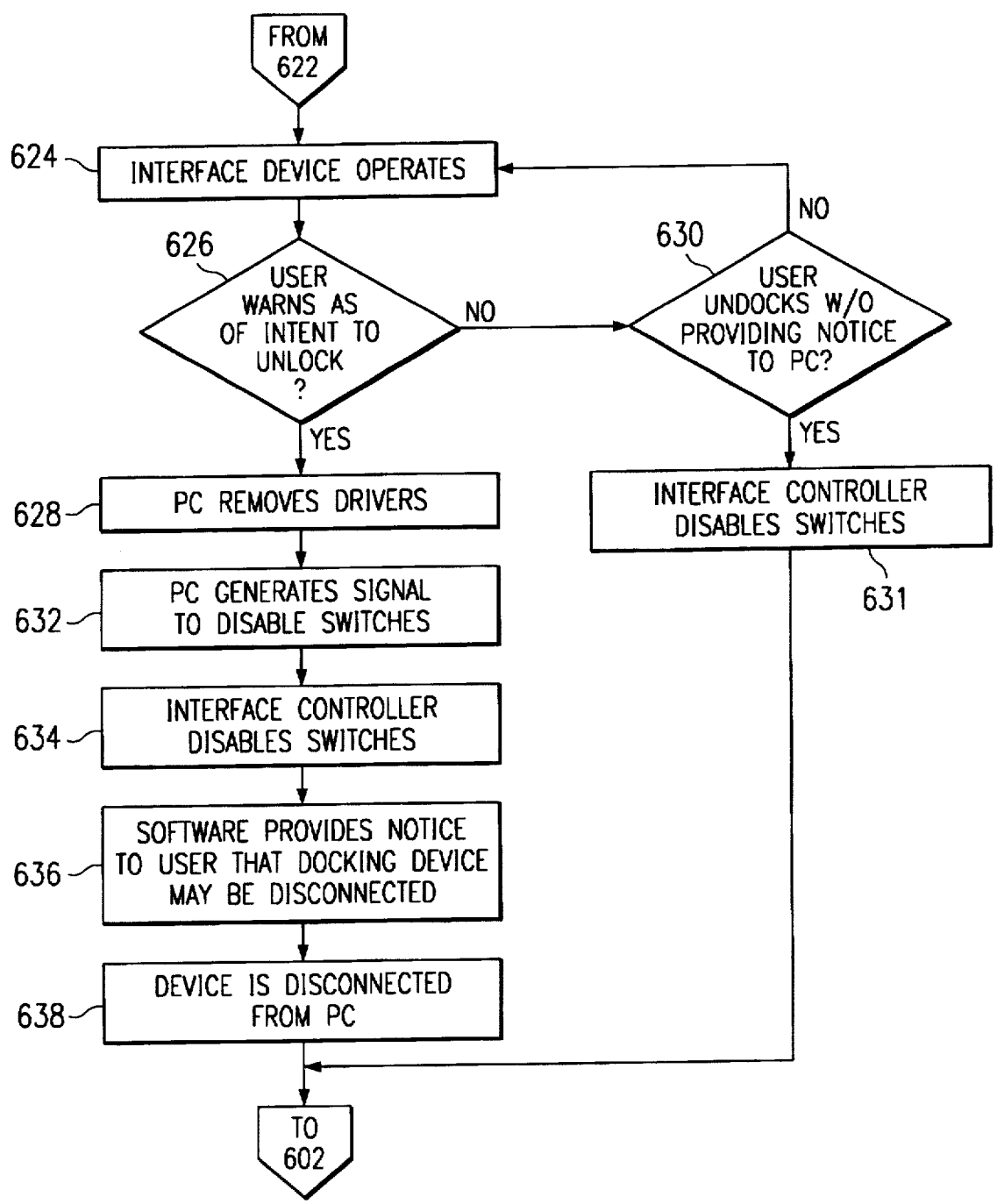

FIGS. 6A and 6B are a flowchart illustrating control logic implemented by the system 10 in accordance with the present invention. The control logic may be implemented by microcode instructions stored in the RAM 504 and in the interface controller 400. Execution begins at step 600 when the PC 12 is powered-up with the docking interface device 14 disconnected therefrom. In step 602, the interface controller 400 remains idle until it detects a 5 volt signal on the line 404c from either of the pins 28a, 28b, indicating that the interface device 14 is about to be docked to the PC 12. If at step 602, the interface controller 400 does not detect such a signal, execution remains at step 602; otherwise, if such a signal is detected, execution proceeds to step 604. At step 604, the 5 volt signal on either or both of the pins 28a, 28b is applied by the interface controller 400 to power-up and, in accordance with their default configuration, disable the switches 402a, 402b, 402c, 402d. At step 606, the 5 volt signal on either or both of the pins 28a, 28b activates the DC-to-DC converter 422 to provide power to the Ethernet and SCSI controllers 412, 414, respectively. It can be appreciated that during the process of docking the interface device 14 to the PC 12, one or both of the extended-length 3.5 mm pins 28a or 28b will engage and make electrical contact with the PC connector 20 before any of the shorter 3.0 mm pins 28c, 28d make such engagement and contact, even if the device connector 28 is not properly aligned, as it is plugged into the PC connector 20. Therefore, the switches 402a, 402b, 402c, 402d will be disabled before any of the pins 28c, 28d engage and establish electrical contact with the connector 20. Following execution of the steps 604 and 606, execution proceeds to step 608. At step 608, a determination is made whether the interface device 14 is docked to the PC 12. In making this determination, the BIOS 510 periodically generates, in a manner commonly known in the art, a signal to the bus 500 to detect whether any new device is connected to the bus. The interface controller 400 monitors the bus 500 via the connectors 20, 28, the pins 28c, and the trace etches 410e. If the controller does not detect the signal generated by the BIOS 510, then execution remains at step 608. If the interface controller 400 detects the signal generated by the BIOS 510, then the interface controller generates a signal to the bus 500 indicating that the interface device 14 is fully docked to the PC 12 and execution proceeds to step 610.

At step 610, a determination is made in a manner commonly known in the art whether the Ethernet controller 418 and the SCSI controller 420 are present (powered-up) and prepared to be initialized. If the controllers 418, 420 are not present and prepared to be initialized, execution remains at step 610; otherwise, execution proceeds to step 612. At step 612, the PC 12 determines when it has reached a point in its operation where it can generate a signal to enable (i.e., close) the switches 402a, 402b, 402c, 402d and where it can initialize the Ethernet and SCSI controllers 412, 414, respectively. If the PC 12 is not ready to so proceed, execution remains at step 612. If the PC 12 is ready to so proceed, execution proceeds to step 614.

At step 614, the switches 402a, 402b, 402c, 402d are enabled (closed). At step 616, signals generated by the PC 12 onto the ISA bus 500 flow through the PC connector 20 to the device connector 28, the 64 pins 28c, the lines 410, the switches 402, the bus 416, and the Ethernet and SCSI controllers 418, 420.

At step 618, a determination is made whether the device drivers necessary to operate the Ethernet and SCSI controllers 412, 414, respectively, are loaded into the RAM 504. If it is determined that such device drivers are not loaded into the RAM 504, as will typically be the case with state-of-the-art operating systems, execution proceeds to step 620; otherwise execution proceeds to step 622. At step 620, the necessary device drivers are loaded into the RAM 504. At step 622, the PC 12 executes calls, via the ISA bus 500, to initialize registers in the Ethernet and SCSI controllers, 412, 414, respectively, to indicate which interrupts the controllers should use and the mode in which the controllers should operate. At step 624, the interface device 14 is operable for interfacing the PC 12 with peripherals connected to the ports 30.

At step 626, input devices such as the keyboard 16 are monitored for user input indicating that the user intends to disconnect the interface device 14 from the PC 12. If such intent is indicated, execution proceeds to step 628; otherwise, execution proceeds to step 630. At step 630, the pins 28c, 28d are monitored to determine whether any of the pins have lost their signal or power, thereby indicating that the interface device 14 is in the process of being disconnected from the PC 12. If it is determined that the interface device 14 is not in such a process, execution returns to step 624. If it is determined, at step 630, that the interface device 14 is being disconnected, execution proceeds to step 631. At step 631, the interface controller 400 generates a signal to disable the switches 402a, 402b, 402c, 402d and execution returns to step 602.

At step 628, the PC 12 may, to the extent that the operating system of the PC is capable, free up memory by removing the drivers loaded into the RAM 504 at step 620. At step 632, the PC 12 generates a signal to the interface controller 400 directing the controller to disable (i.e., open) the switches 402a, 402b, 402c, 402d. At step 634, the switches 402a, 402b, 402c, 402d are disabled. At step 636, the PC 12 provides notice to the user that the interface device 14 may be disconnected from the PC. At step 638, the interface device 14 is disconnected from the PC 12. It is understood at step 638 that power from the DC-to-DC converter 422 to the Ethernet and SCSI controllers 412, 414 respectively, is also disconnected when the interface device 14 is disconnected from the PC 12. After the interface device 14 is disconnected from the PC 12, execution returns to step 602.

It can be appreciated that as the interface device 14 is disconnected subsequent to steps 631 or 634, the pins 28a, 28b, 28c, 28d, and the signals thereon, may bounce between 5 volts and ground as the pins make intermittent contact with the receptacles of the connector 20. To prevent such intermittent contact from corrupting the ISA bus 500 and to prevent active signals from affecting the interface device 14 as it loses power, the capacitor 404 maintains 5 volts on the line 404c to the controller 400 to keep the switches 402a, 402b, 402c, 402d disabled until the interface device 14 is fully undocked (disconnected) from the PC 12.

The embodiment of the present invention as described herein has many advantages over the prior art. For example, a docking device may be readily, and safely, hot-plugged into a PC. A further advantage is conservation of electrical energy by eliminating the need for the docking device to be poweredup at all times. A still further advantage is compatibility with "plug and play" hot card capabilities available with state of the art operating systems.

It is understood that the present invention can take many forms and embodiments. The embodiments shown herein are intended to illustrate rather than to limit the invention, it being appreciated that variations may be made without departing from the spirit or the scope of the invention. For example, the invention could be adapted for use with device controllers other than the Ethernet and SCSI device controllers 412, 414 and for use with peripherals other than those described above in relation to the ports 30. The interface switches 402a, 402b, 402c, 402d may be implemented using a number of different devices such as integrated or discrete transistors and may each be operative on any number of lines other than 16 lines as described above. Furthermore, any number of pins 28a, 28b, 28c, 28d may be utilized with the PC connector 28, which pins may form a part of either the device connector 28 and/or the PC connector 20. The pins 28a, 28b, 28c, 28d may also have a number of different lengths. For example, in addition to providing the connector 28 with extended-length 3.5 mm pins 28a, 28b and 3.0 mm pins 28c, 28d as described in the present invention, pins may also be provided having, for example, 2.5 mm lengths, which pins would be electrically connected to the interface controller 400. Such 2.5 mm pins may provide a more responsive and accurate indication, in step 630, of when the interface device 14 is being disconnected from the PC 12 without notice through the PC 12. This is so because the 2.5 mm pins will disengage from the connector 20 before any longer pins disengage and, hence, a signal will be lost from a 2.5 mm pin before it will be lost from a longer pin. The switches 402a, 402b, 402c, 402d could thus be disabled before the 3.0 mm pins are disconnected, thereby providing greater electrical and logical security to the system. The switches may also be utilized for any number of lines from the device connector 28, or in conjunction with other bus systems, such as the Extended ISA (EISA) bus standard.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of hot-plugging a peripheral device to an active computer bus via an interface device comprising an array of normally open interface switches and a device controller, said peripheral device being connected to said interface switches via said device controller, the method comprising:

detecting connection of said interface device to said computer bus;

responsive to said detecting, supplying operating power to said device controller; and responsive to said supplying, closing said interface switches, thereby electrically connecting said peripheral device to said computer bus;

subsequent to said closing, detecting an impending disconnection of said interface device from said computer bus by detecting a predetermined sequence of keystrokes inputted by a user through a keyboard; and responsive to said detecting an impending disconnection, opening said interface switches, thereby electrically disconnecting said peripheral device from said computer bus.

2. Apparatus for enabling a peripheral device to be hot-plugged to an active bus of a computer, the apparatus comprising:

a device controller;

a peripheral device electrically connected to said device controller;

an array of normally open interface switches electrically connected to said device controller;

an interface controller for selectively actuating said interface switches;

a first connector electrically connected to said interface controller and comprising a plurality of pins, wherein at least one of said pins is longer than the remainder of said pins;

a second connector electrically connected to said computer bus and comprising a plurality of receptacles for receiving said pins of said first connector;

means for generating a signal to said interface controller responsive to detection of a predetermined sequence of keystrokes inputted by a user through a keyboard, wherein responsive to receipt of said signal, said interface controller opens said switches to electrically isolate said peripheral device from said computer bus;

wherein responsive to connection of said first connector to said second connector, a first signal is applied to said interface connector via said at least one pin; and wherein responsive to said first signal, said interface controller supplies operating power to said peripheral device via said device controller and then closes said interface switches, thereby electrically connecting said peripheral device to said computer bus.

* * * * *